United States Patent [19]

Ooyama et al.

[11] Patent Number: 6,060,551

[45] Date of Patent: May 9, 2000

[54] AIR BAG COVER FOR PASSENGER

[75] Inventors: Hiroshi Ooyama; Tatsuo Hamanaka, both of Ichihara, Japan

[73] Assignee: Sumitomo Chemical Company, Limited, Osaka, Japan

[21] Appl. No.: 09/116,199

[22] Filed: Jul. 16, 1998

[30] Foreign Application Priority Data

Jul. 17, 1997 [JP] Japan .................................. 9-192667

[51] Int. Cl.[7] ................................ C08J 5/01; C08K 3/34
[52] U.S. Cl. ................................ 524/490; 428/43; 525/98
[58] Field of Search .................................. 524/571, 490; 428/43; 525/98

[56] References Cited

U.S. PATENT DOCUMENTS

| | | | |
|---|---|---|---|
| 3,919,358 | 11/1975 | Batiuk | 260/897 |
| 4,036,912 | 7/1977 | Stricharczuk | 260/897 |
| 4,088,713 | 5/1978 | Herman | 260/897 |
| 4,088,714 | 5/1978 | Huff | 260/897 |
| 4,113,804 | 9/1978 | Cotten | 260/897 |
| 4,113,806 | 9/1978 | Watson | 260/897 |
| 4,889,888 | 12/1989 | Bassi | 525/75 |
| 5,110,647 | 5/1992 | Sawada | 428/43 |
| 5,180,629 | 1/1993 | Terada | 428/220 |
| 5,308,700 | 5/1994 | Hikasa | 428/402 |
| 5,525,675 | 6/1996 | Masuda | 525/194 |
| 5,611,565 | 3/1997 | Inaba et al. | |
| 5,641,554 | 6/1997 | Koizumi | 428/131 |
| 5,763,520 | 6/1998 | Park | 524/451 |
| 5,817,420 | 10/1998 | Murakami | 428/424.8 |

OTHER PUBLICATIONS

Partial English Translation of JP–08176368A, Column 2, line 26 to column 7, line 21.

Partial English Translation of JP–52116537A, p. 229, left and lower column, line 2 to right and lower column, line 4.

*Primary Examiner*—Paul R. Michl
*Attorney, Agent, or Firm*—Birch, Stewart, Kolasch & Birch, LLP

[57] ABSTRACT

An air bag cover for a passenger of an automobile, obtained by molding a thermoplastic elastomer composition which comprises an olefin-based resin (A) and an ethylene-α-olefin-based copolymer rubber (B), and provides a 2 mm thick molded body composed of the composition having a linear thermal expansion coefficient at a temperature of −40 to 120° C. of $13.5 \times 10^{-5}$ mm/m°C. or less, a fracture elongation at weld part of 50% or more, and an Izod impact strength at a temperature of −50° C. or more of 35 kg·cm/cm or more, or revealing Non Break.

According to the present invention, there can be provided an air bag cover for a passenger side seat of an automobile, which does not cause building up or separation from surrounding parts when installed and set into a dash board of the automobile, and has excellent safety in spreading.

12 Claims, 1 Drawing Sheet

AIR BAG COVER FOR PASSENGER

BACKGROUND OF THE INVENTION

1. Field of the Invention

The present invention relates to an air bag cover for a passenger (an occupant on the seat next to a driver) of an automobile. More particularly, the present invention relates to an air bag cover for a passenger of an automobile, which does not cause building up or separation from surrounding parts due to thermal expansion and thermal contraction when installed and set into a dash board (instrument panel) of the automobile, and has excellent spreading safety.

2. Description of the Related Arts

Recently, there are increasing number of automobiles loaded with air bags for protecting occupants from impact in collision. An air bag is accommodated in an air bag cover in normal condition.

Nowadays, it is regarded important to provide an air bag for securing safety of an occupant on the seat next to the driver as well as the driver. The air bag (cover) for an occupant on the seat next to the driver is usually set by being built in a dashboard. However, when set as described above, there are problems that the air bag cover is pushed and built up due to thermal expansion and separated from surrounding parts due to thermal contraction.

Further, an air bag cover usually has complicated form, and injection molded article has a lot of weld lines. In the case of an air bag cover using a material having low strength at weld parts, there is crisis that the cover was broken from the weld parts in spreading and fractures are scattered, namely there is a problem regarding safety in spreading.

SUMMARY OF THE INVENTION

An object of the present invention is to provide an air bag cover for a passenger of an automobile, which does not cause building up or separation from surrounding parts when installed and set into a dash board of the automobile, and has excellent safety in spreading.

According to the present invention, there is provided an air bag cover for a passenger of an automobile, obtained by molding a thermoplastic elastomer composition which comprises (A) an olefin-based resin and (B) an ethylene-α-olefin-based copolymer rubber, wherein a molded body having a thickness of 2 mm of said composition has a linear thermal expansion coefficient at a temperature of −40 to 120° C. of $13.5 \times 10^{-5}$ mm/mm°C. or less, an fracture elongation at weld part of 50% or more, and an Izod impact strength at a temperature of not lower than −50° C. of 35 kgf·cm/cm or more, or showing Non Break.

DETAILED DESCRIPTION OF THE INVENTION

Figure 1:
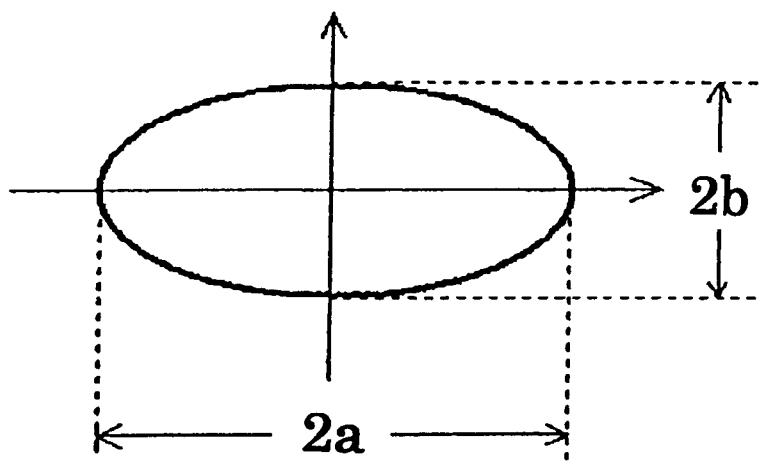
FIG. 1 shows the length (2a) of major axis and the length (2b) of minor axis of a rubber particle when the sectional shape of the rubber particle is regarded as long circle shape of elliptic shape.

The olefin-based resin (A) used in the present invention (herein after, sometimes abbreviated as (A)) is preferably homopolypropylene or a copolymer of propylene with ethylene and/or an α-olefin having 4 or more carbon atoms. Examples of the α-olefin having 4 or more carbon atoms include preferably an α-olefin having 4 to 12 carbon atoms such as 1-butene, 1-pentene, 3-methyl-1-butene, 1-hexene, 1-decene, 3-methyl-1-pentene, 4-methyl-1-pentene, 1-octene and the like. Homopolypropylene or a random or block copolymer of propylene as a main component with α-olefin and/or ethylene (particularly ethylene) is preferred. The olefin-based resin has a melt flow rate in the range usually from 0.1 to 100 g/10 minutes, preferably from 1 to 70 g/10 minutes measured under conditions of a temperature of 230° C. and a load of 2.16 kg (21.18N) according to JIS K-7210 regarding an olefin-based resin.

As the ethylene-α-olefin-based copolymer rubber (B) used in the present invention (herein after, sometimes abbreviated as "(B)"), an ethylene-α-olefin copolymer rubber and ethylene-α-olefin-non-conjugated diene copolymer rubber can be listed. Further, as (B), an oil-extended ethylene-α-olefin-based copolymer rubber may also be used.

Concrete examples of the α-olefin in the ethylene-α-olefin-non-conjugated diene copolymer rubber, include α-olefins having 3 to 12 carbon atoms such as propylene, 1-butene, 1-pentene, 1-hexene, 4-methyl-1-pentene, 1-octene, 1-decene and the like, and among these, propylene is preferable. Concrete examples of the non-conjugated diene include linear or branched chain non-conjugated dienes such as 1,4-hexadiene, 1,6-octadiene, 2-methyl-1,5-hexadiene, 6-methyl-1,5-heptadiene and 7-methyl-1,6-octadiene; cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; trienes such as 2,3-diisopropylidene-5-norbornene, 2-ethylidene-3-isopropylidene-5-norbornene, 2-propenyl-2,2-norbornadiene, 1,3,7-octatriene and 1,4,9-decatriene, and among them, 5-ethylidene-2-norbornene or dicyclopentadiene is preferable.

As the α-olefin in the ethylene-α-olefin-based copolymer rubber, preferably, α-olefins having 3 to 12 carbon atoms such as propylene, 1-butene, 1-pentene, 1-hexene, 4-methyl-1-pentene, 1-octene and 1-decene are listed, and among them, propylene, 1-butene and 1-octene are more preferable. As preferable specific examples, ethylene-propylene copolymer rubber, ethylene-butene copolymer rubber and ethylene-octene copolymer rubber having an α-olefin content of 10 to 40% by weight, preferably 20 to 30% by weight can be listed.

The ethylene-α-olefin-based copolymer rubber (B) has a Mooney viscosity at 100° C. ($ML_{1+4}$ 100° C.) of preferably 5 to 150, more preferably 10 to 80. When the Mooney viscosity is too low, mechanical strength is sometimes inferior and fracture elongation at weld part may extremely decrease, and on the other hand, when the Mooney viscosity is too high, the appearance of a molded article may become poor, injection molding may become difficult, and linear expansion thermal coefficient may become too high. When an oil-extended rubber is used as (B), the Mooney viscosity of (B) represents the value of the oil-extended rubber.

In the thermoplastic elastomer composition used in the present invention, the weight of (A) per 100 parts by weight of (B) is preferably from 25 to 400 parts by weight, more preferably 40 to 150 parts by weight. When the amount of (A) is less than 25 parts by weight, the fracture elongation at weld part sometimes decrease, and on the other hand, when the amount of (A) is over 400 parts by weight, impact resistance sometimes decrease and linear thermal expansion coefficient sometimes increase.

In the present invention, when an oil-extended rubber is used as (B), the weight of (B) means the weight of the oil-extended rubber.

The thermoplastic elastomer composition used in the present invention may contain at least one of the following (C) to (E) in addition to the essential components (A) and (B):

(C): A hydrogenated aromatic vinyl-conjugated diene compound block copolymer obtained by hydrogenation of a block copolymer composed of at least two aromatic vinyl compound polymer blocks and at least one conjugated diene compound polymer block, (D): A plasticizer for rubber, and (E): A cross-linked thermoplastic elastomer.

The component (C) is a hydrogenated aromatic vinyl-conjugated diene compound block copolymer obtained by hydrogenation of a block copolymer composed of at least two aromatic vinyl compound polymer blocks and at least one conjugated diene compound polymer block, and has structure, for example, of A—B—A, (A—B)n [n (n usually represents an integer from 2 to 5 ) pairs of A—B di-blocks are connected via a polyfunctional coupling agent at the B end] or the like. In this formula, A represents an aromatic vinyl compound polymer block, and B represents a polymer block obtained by hydrogenating a conjugated diene polymer block. The aromatic vinyl compound in (C) is preferably styrene from industrial point of view. The conjugated diene compound in (C) is preferably butadiene or isoprene from industrial point of view.

When (B) is an ethylene-propylene copolymer rubber, the number average molecular weight of (C) is preferably 100000 or more. When the molecular weight of (C) is less than 100000, the mechanical strength of the thermoplastic elastomer composition sometimes decreases, and due to decrease in the melt viscosity of (C), the effect for suppressing orientation of (B) sometimes decreases and the fracture elongation of the weld part of the thermoplastic elastomer composition sometimes does not improved.

The ratio by weight of aromatic vinyl compound/conjugated diene compound in (C) is preferably from 10/90 to 50/50. When the amount of the aromatic vinyl compound is too small (the amount of the conjugated diene compound is too large), the mechanical strength sometimes does not improved, and on the other hand, when the amount of the aromatic vinyl compound is too large (the amount of the conjugated diene compound is too small), the elastic modulus sometimes increase and the impact resistance of the thermoplastic elastomer is not sometimes improved. The content of the aromatic compound in the hydrogenated aromatic vinyl-conjugated diene compound block copolymer is preferably in the range from 15 to 38% by weight.

When the average eccentricity of the sectional shape of the rubber particle explained below is 0.95 or more, the number average molecular weight of (C) is preferably 100000 or more. When the average eccentricity of the sectional shape of the rubber particle is less than 0.95, the number average molecular weight of (C) is preferably less than 100000.

The content of (C) in the thermoplastic elastomer of the present invention is preferably 500 parts by weight or less, and more preferably from 10 to 300 parts by weight per 100 parts by weight of (B). In the case of 100000 or more of the molecular weight of (C), when the amount of (C) is too small, the effect to suppressing the orientation of rubber sometimes becomes insufficient and the fracture elongation of the weld part of the thermoplastic elastomer is not sometimes improved, and on the other hand, when the content of (C) is too large, the flowability sometimes decrease, the moldability sometimes steeply decrease, and flow marks sometimes appears on the surface of the molded article to deteriorate the appearance. In the case of less than 100000 of the molecular weight of (C), when the amount of (C) is too small, the linear expansion coefficient is not sometimes improved, and on the other hand, when the content of (C) is too large, the fracture elongation at the weld part sometimes decreases.

The component (D) is a plasticizer for rubber. Specific examples of (D) include paraffin-based oil, silicone-based oil, polyisobutylene-based oil and the like, and among them, paraffin-based oil is preferable and paraffin-based oil from which an aromatic compound and naphthene-based compound are excluded as completely as possible is particularly preferable from a view point of heat resistance and weatherability.

When the number average molecular weight of the components (B) and/or (C) is large and the flowability of the thermoplastic elastomer composition is too small, the thermoplastic elastomer composition may contain (D) in addition to the components (A), (B) and optional components (C) and (E) for improving the flowability. The content of (D) in the thermoplastic elastomer composition is preferably 100 parts by weight or less, and more preferably from 5 to 50 parts by weight per 100 parts by weight of (B). When the content of (D) is too small, the flowability is not improved, and the appearance of a molded article is not sometimes improved. On the other hand, when the content of (D) is too large, the impact resistance at low temperature sometimes decreases. When an oil-extended rubber is used as (B), the weight of the component (D) does not include the weight of an extending oil contained in the rubber.

The component (E) which is optionally used for improving fracture elongation at the weld part as well as (C) having a number molecular weight of more than 100000 is a cross-linked thermoplastic elastomer. So that, when the average eccentricity is 0.95 or more, the thermoplastic elastomer composition may contain (E) in addition to the contents (A), (B) and optional components (C) and (D).

As component (E), a completely cross-linked, partially cross-linked olefin-based thermoplastic elastomer, or a mixture thereof can be used. (E) is prepared by heat treatment with kneading an olefin-based resin (defined as the same as (A)) and an olefin-based rubber (defined as the same as (B)) together with a cross-linking agent and/or a cross-linking aid using a kneader or the like, and has structure in which the olefin-based rubber is dispersed as rubber particles in the olefin-based resin. The diameter of the rubber particle is usually 3 $\mu$m or less, and preferably 1 $\mu$m or less. When the diameter of the rubber particle is too large, the impact resistance at low temperature sometimes decrease.

In the present invention, the content of (E) in the thermoplastic elastomer composition is preferably 500 parts by weight or less, and more preferably from 10 to 200 parts by weight per 100 parts by weight of (B). When the content of (E) is too small, the fracture elongation at the weld part is not sometimes improved, and on the other hand, when the content of (E) is too large, the linear expansion coefficient sometimes increases.

The molded article made from the thermoplastic elastomer composition, when the thickness thereof is 2 mm, has a linear thermal expansion coefficient at a temperature of −40 to 120° C. of 13.5×10⁻⁵ mm/mm°C. or less, preferably 8.0×10⁻⁵ mm/mm°C. or less, an fracture elongation at weld part of 50% or more, preferably 100% or more, and an Izod impact strength at a temperature of −50° C. or more of 35 kgf·cm/cm or more, or showing Non Break, preferably 50 kgf·cm/cm or more, or reveals Non Break.

The Non Break means that a test sample is not broken in Izod impact test described blow. When the linear thermal expansion coefficient is too large, there occur problems that an air back cover is built up from surrounding parts and separated (makes clearance) from surrounding parts. When the fracture elongation at the weld part is too small, the safety in expansion is inferior. Also when the Izod impact strength is too small, the safety in expansion is inferior.

In the present invention, the resulted molded article has structure in which rubber particles are dispersed in continuous phase of a resin, and the average eccentricity of the sectional shape of the rubber particle is preferably 0.4 to 0.95, more preferably 0.5 to 0.95. When the average eccentricity is too small, the linear thermal expansion coefficient sometimes becomes too large, and on the other hand, when the average eccentricity is too large, the fracture elongation at weld part sometimes becomes too small. The average eccentricity is a value as defined below, and determined as described below.

When the sectional shape of a rubber particle is regarded as oval shape (e.g. elliptic shape) as shown in FIG. 1, the eccentricity (ε) is calculated according to the equation (1) described below using the length (2a) of the major axis and the length (2b) of the minor axis (see FIG. 1).

$$\varepsilon = \frac{\sqrt{a^2 - b^2}}{a} \quad (1)$$

Figure 2:
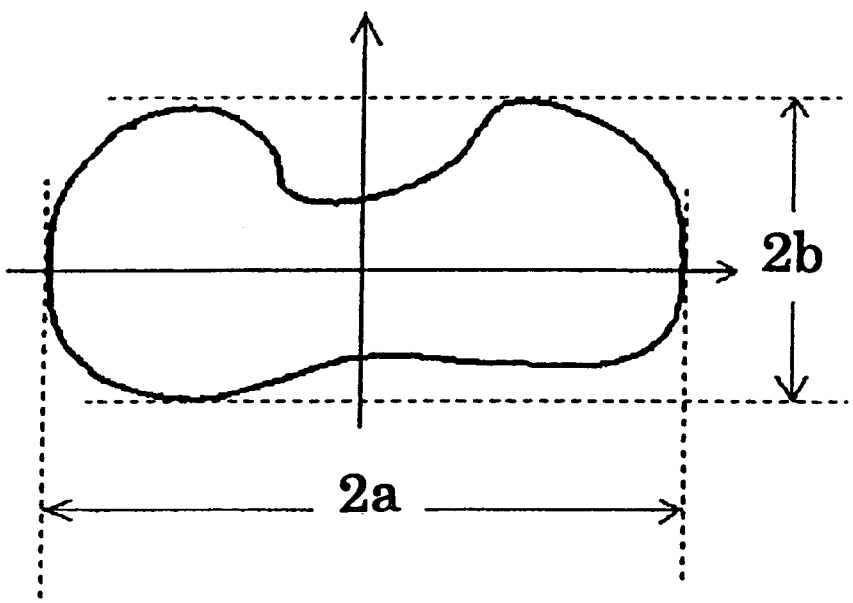
FIG. 2 shows the length (2a) of major axis and the length (2b) of minor axis a rubber particle when the sectional shape of the rubber particle is irregular.

When the sectional shape of a rubber particle is irregular as shown in FIG. 2, the major axis is set along the maximum length direction of the shape, and the minor axis is set so as to cross the major axis. Then, the eccentricity (ε) is calculated according to the above-described equation (1) using the lengths of the major axis and the minor axis.

Alternatively, the number of rubber particles per unit area is represented by n and the eccentricity of each rubber particle is represented by $\varepsilon_m$(m=1, 2, 3 . . . n), and the average eccentricity ([ε]) is calculated according to the following equation (2).

$$(\varepsilon) = \frac{\sum_{m=1}^{n} \varepsilon_m}{n} \quad (2)$$

The observation of the rubber particle is conducted as follows. A molded article is cut to make a mirror surface. The sample on which the mirror surface had been made was immersed in a bichromate mixed acid (mixed solution of potassium bichromate and sulfuric acid), and etching was effected. For etching, the mixed solution is heated at 60° C. with a water bath, and the sample is immersed for about 30 minutes in the mixed solution. The etched sample was subjected to vapor deposition treatment (vacuum evaporation) by sputtering, and the shape of the rubber particle was observed by SEM (scanning electron microscope). The average eccentricity is an average of eccentricities of rubber particles existing in unit area. The eccentricity has relation mainly to combination of MFR of the component (A) and the Mooney viscosity of the component (B), and when MFR of the component (A) is constant, there is a relation that higher the Mooney viscosity of the component (B), the lower the eccentricity. Therefore, in view of this relation, the eccentricity can be controlled within the above-described range by suitably selecting MFR of the component (A) and the Mooney viscosity of the component (B) with in the above-described range.

Additives such as antioxidants, heat stabilizers, ultraviolet absorbers, lubricants, antistatic agents, pigments, fillers, flame retardants and the like may be optionally added to the thermoplastic elastomer composition in addition to the above-described components.

As a method for obtaining the thermoplastic composition used in the present invention, there are illustrated a melt-kneading method using a twin screw extruder, Banbury mixer, or the like.

The average size of rubber particles present in the thermoplastic elastomer composition is changed depending on the degree of shear stress acted at kneading. Particularly, the average size is too large, the impact strength markedly decreases. The average size of the rubber particles is preferably not more than 50 μm, more preferably not more than 10 μm. When the particle size of the rubber particles is large, the composition tends to be affected by the shear stress at injection molding, and the fracture elongation at the weld part of thus obtained molded article sometimes lowered because of strong orientation of the article.

Furthermore, the components (C) and (E) are sometimes occluded in rubber particles of (B) by kneading. The mechanism is not clear, but as the result, the components (C) and (E) occluded in the rubber particles, act controlling of the orientation of the rubber particles. The larger the size of the (C) or (E) is, the larger the effect of controlling of the orientation becomes, and the larger the linear thermal extension coefficient tends to become.

As described above, properties of the thermoplastic elastomer composition may be changed depending upon conditions of kneading. When kneaders are the same in structure, the use of the kneader of a small scale is better than that of large scale kneader because of giving a strong shear stress a resin mixture to be kneaded and having a high distribution ability. Further, the use of a twin screw extruder is more preferable than the use of a Banbury mixer when they have a equal production capacity, and the shear rate is preferably not less than 100 second⁻¹, preferably not less than 500 second⁻¹. And, the degree of shear stress given a mixture to be kneaded and properties of a composition obtained by kneading may be varied depending on the order of components to be charged into the kneader. When a rubber of high melt viscosity and a resin of low melt viscosity are kneaded, it is preferable that the ratio of the rubber is increased (the amount of the resin is decreased) so that the shear is easily given, and thus kneaded mixture and the balance of the resin are kneaded. And, when components (C), (D) and (E) are used in addition to components (A) and (B), a composition obtained by a multi-step kneading method comprising kneading said components (C), (D), (E) and a part of the component (B), and then kneading thus kneaded mixture, the component (A) and the remained component (B), sometimes has a good physical properties compared with a composition obtained by a single-step kneading of those components. Accordingly, a proper kneading method should be selected taking account of the above-described matters and the like to obtain the thermoplastic elastomer composition, satisfying physical properties required, suitable for the air bag cover for a passenger seat of the present invention.

EXAMPLE

The following examples further illustrate the present invention in more detail.

[I] Raw Material

Raw materials described below were used for obtaining compositions in examples and comparative examples.

(A) Olefin-based resin

A-1: Crystalline propylene-ethylene block copolymer (content of ethylene-propylene random copolymer part: 17% by weight, ethylene content in ethylene-propylene random copolymer part: 40% by weight, MFR at a temperature of 230° C. under a load of 2.16 kg: 65 g/10 minutes)

A-2: Crystalline propylene-ethylene block copolymer (content of ethylene-propylene random copolymer part: 13% by weight, ethylene content in ethylene-propylene random copolymer part: 25% by weight, MFR at a temperature of 230° C. under a load of 2.16 kg: 30 g/10 minutes)

A-3: Crystalline propylene-ethylene random copolymer (ethylene content: 3.2% by weight, MFR at a temperature of 230° C. under a load of 2.16 kg: 30 g/10 minutes)

(B) Ethylene-α-olefin-based copolymer rubber

B-1: Ethylene-propylene copolymer rubber having a Mooney viscosity ($ML_{1+4}$ 100° C.) of 52 and a propylene content of 27%.

B-2: Ethylene-propylene copolymer rubber having a Mooney viscosity ($ML_{1+4}$ 100° C.) of 48 and a 1-butene content of 17%.

B-3: Ethylene-propylene copolymer rubber having a Mooney viscosity ($ML_{1+4}$ 100° C.) of 43 and a propylene content of 53%.

B-4: Ethylene-propylene-5-ethylidene-2-norbornene copolymer rubber having a Mooney viscosity ($ML_{1+4}$ 100° C.) of 92, a propylene content of 31% and an iodine value of 1.3.

(C) Hydrogenated aromatic vinyl-conjugated diene compound block copolymer

C-1: Hydrogenated styrene-butadiene-styrene block copolymer (SEBS), Kraton® G1651 manufactured by Shell Chemical Corp.

C-2: Hydrogenated styrene-butadiene-styrene block copolymer (SEBS), TUFTEC® H1052 manufactured by Asahi Chemical Industry Co., Ltd.

(D) Plasticizer for rubber

D-1: Paraffin-based mineral oil softening agent, Diana Process® Oil PW-380 manufactured by Idemitsu Kosan Co., Ltd.

E-1: Olefin-based crosslinked thermoplastic elastomer, Sumitomo TPE 1500 manufactured by Sumitomo Chemical Co., Ltd.

[II] Additive Formulation

Additive formulation was as follows in any of examples and comparative examples:

| Per 100 parts by weight of a thermoplastic elastomer composition (including a paraffin-based mineral oil softening agent) | |
|---|---|
| Antioxidant: Sumilizer ® BP-101 (manufactured by Sumitomo Chemical Co., Ltd.) | 0.2 parts by weight |
| light stabilizer: Sanol ® LS770 (manufactured by Ciba Geigy Corp.) | 0.05 parts by weight |
| light stabilizer: Sumisorb ® 300 (manufactured by Sumitomo Chemical Co., Ltd.) | 0.1 part by weight |
| Lubricant: Oleic amide | 0.1 part by weight |

[III] Evaluation and Measuring Method

The resulted composition was injection-molded at a cylinder temperature of 220° C. and a mold temperature of 50° C. to prepare a specimen, and physical properties thereof were evaluated.

Various properties described in examples and the comparative examples were measured according to the following methods.

(1) Izod impact test: (JIS K6911, specimen of 12 mm in thickness with notch (six test pieces of 2 mm in thickness were piled)

(2) Weld part tension test

A flat plate having opposite welds formed on the center part by injection molding using a mold having opposite two gates was prepared. A JIS No.3 tension test specimen was punched out from the flat plate by a punching dumbbell so that the weld line was at the center between reference lines. The tension test specimen was tested according to JIS K6301 (No.3 dumbbell was used, tensile speed: 200 mm/min).

(3) Measurement of linear expansion coefficient

A molded body having a thickness of 2 mm was punched out to give size of 12.7×12.7 mm, and the linear expansion was measured by TMA (thermomechanical analysis) under a load of 2 g. The measuring temperature was from −60° C. to 130° C., the temperature-raising speed was 5° C./minute, and the linear expansion was measured in both of MD direction and TD direction. The linear expansion coefficients between −40 to 120° C. were calculated from the resulted data, and the average of the values in MD direction and TD direction was used as the linear expansion coefficient of the sample.

EXAMPLE 1

135 parts by weight of a crystalline propylene-ethylene block copolymer (A-1), 100 parts by weight of ethylene-propylene copolymer rubber (B-1), 53 parts by weight of SEBS (C-1), 24 parts by weight of a paraffin-based mineral oil softening agent (D-1) and additives were kneaded in a 16-liter Banbury mixer between 170 to 200° C., then, pellets were prepared using an extruder. Using the resulted composition, injection molding was conducted, a specimen was prepared, and physical properties thereof were evaluated. As shown in table 1, the fracture elongation at the weld part was over 50%, and the linear expansion coefficient and Izod impact strength were also excellent, and it was judged that the thermoplastic elastomer composition could be used as an air bag cover for a passenger of an automobile.

EXAMPLES 2 TO 5

The same procedure was conducted in the same manner as in Example 1 except that conditions shown in Table 1 were used. The results were shown in Table 1. Each thermoplastic elastomer composition was judged that it could be used as an air bag cover for a passenger side seat of an automobile like in Example 1.

EXAMPLE 6

94 parts by weight of the crystalline propylene-ethylene block copolymer (A-2), 100 parts by weight of the ethylene- α-olefin-based copolymer rubber (38 part by weight of B-1, 50 parts by weight of B-2 and 12 parts by weight of B-3), 47 parts by weight of the crosslinked thermoplastic elastomer and the additives were kneaded in a twin screw extruder at a temperature between 200 to 240° C. to obtain pellets. Using the resulted pellets, injection molding was conducted, a specimen was prepared, and physical properties thereof were evaluated. As shown in table 2, the fracture elongation at the weld part was over 50%, and the linear thermal expansion coefficient and Izod impact strength were also excellent, and it was judged that the thermoplastic elastomer composition could be used as an air bag cover for a passenger of an automobile.

EXAMPLES 7 AND 8

The same procedure was repeated in the same manner as in Example 6 except that conditions shown in Table 2 were used. The results were shown in Table 2. Each thermoplastic elastomer composition was judged that it could be used as an air bag cover for a passenger side seat of an automobile like in Example 6.

COMPARATIVE EXAMPLE 1

100 parts by weight of the crystalline propylene-ethylene random copolymer (A-3), 100 parts by weight of ethylene-α-olefin-based copolymer rubber (20 parts by weight of B-3 and 80 parts by weight of B-4) and the additives were kneaded in a 170-liter Banbury mixer at a temperature between 170 to 200° C., and then, pellets were prepared using an extruder. Using the resulted composition, injection molding was conducted, a specimen was prepared, and physical properties thereof were evaluated. As shown in table 2, the average eccentricity was over 0.95, and the fracture elongation at the weld part was below 50%. It was judged that the thermoplastic elastomer composition could not be used as an air bag cover for a passenger of an automobile.

TABLE 1

|  | Example 1 | Example 2 | Example 3 | Example 4 | Example 5 |
|---|---|---|---|---|---|
| Compound |  |  |  |  |  |
| A-1 | 135 | 106 | 83 | 64 | 47 |
| A-2 | 0 | 14 | 26 | 35 | 43 |
| B-1 | 100 | 100 | 100 | 100 | 100 |
| C-1 | 53 | 42 | 33 | 25 | 18 |
| D-1 | 24 | 19 | 15 | 12 | 8 |
| Evaluation |  |  |  |  |  |
| Average eccentricity | 0.54 | 0.67 | 0.88 | 0.90 | 0.90 |
| Izod impact strength kgf · cm/cm | NB | NB | NB | NB | NB |
| Strength at weld part kgf/cm$^2$ | 94 | 78 | 70 | 67 | 64 |
| Elongation at weld part % | 460 | 273 | 145 | 83 | 56 |
| Linear expansion coefficient mm/mm ° C. | 13.5 × 10$^{-5}$ | 11.9 × 10$^{-5}$ | 9.7 × 10$^{-5}$ | 8.2 × 10$^{-5}$ | 5.5 × 10$^{-5}$ |

NB: not broken

TABLE 2

|  | Example 6 | Example 7 | Example 8 | Comparative Example 1 |
|---|---|---|---|---|
| Compound |  |  |  |  |
| A-2 | 94 | 107 | 54 |  |
| A-3 |  |  |  | 100 |
| B-1 | 38 | 43 | 31 |  |
| B-2 | 50 | 57 | 69 |  |
| B-3 | 12 |  |  | 20 |
| B-4 |  |  |  | 80 |
| C-2 |  | 14 |  |  |
| E-1 | 47 | 54 |  |  |
| Evaluation |  |  |  |  |
| Average eccentricity | 0.92 | 0.86 | 0.73 | 0.98 |
| Izod impact strength kgf · cm/cm | NB | NB | NB | NB |
| Strength at weld part kgf/cm$^2$ | 99 | 150 | 176 | 70 |
| Fracture Elongation at weld part % | 450 | 570 | 560 | 19 |
| Linear expansion coefficient mm/mm ° C. | 8.7 × 10$^{-5}$ | 8.2 × 10$^{-5}$ | 4.2 × 10$^{-5}$ | 8.0 × 10$^{-5}$ |

As described above, according to the present invention, there can be provided an air bag cover for a passenger of an automobile, which does not cause building up or separation from surrounding parts when installed and set into a dash board of the automobile, and has excellent safety in spreading.

What is claimed is:

1. An air bag cover for a passenger of an automobile, comprising a molded article having a weld part obtained by injection-molding a thermoplastic elastomer composition which comprises:
   25 to 400 parts by weight of an olefin-based resin (A) selected from the group consisting of polypropylene and a copolymer of propylene and an α-olefin other than propylene having 4 or more carbon atoms,
   100 parts by weight of an ethylene-α-olefin-based copolymer rubber (B),
   10 to 300 parts by weight of a hydrogenated aromatic vinyl-conjugated diene compound block copolymer (C) obtained by hydrogenation of a block copolymer composed of a conjugated diene compound of a block copolymer composed of at least two aromatic vinyl compound polymer blocks and at least one conjugated diene compound polymer block,
   5–50 parts by weight of a plasticizer for rubber (D), and
   10 to 200 parts by weight of a crosslinked thermoplastic elastomer (E); and provides a 2 mm thick molded body composed of the composition having a linear thermal expansion coefficient at a temperature of −40 to 120° C. of 13.5×10$^{-5}$ mm/mm°C. or less, a fracture elongation at weld part of 50% or more, and an Izod impact strength at a temperature of −50° C. or more of 35 kg·cm/cm or more, or revealing Non Break.

2. The air bag cover for a passenger of an automobile according to claim 1, wherein the average eccentricity of the sectional shape of a rubber particle in said molded body is from 0.4 to 0.95.

3. The air bag cover for a passenger of an automobile according to claim 1, wherein the melt flow rate measured under conditions of a temperature of 230° C. and a load of 2.16 kg (21.18N) according to JIS K-7210 regarding an olefin-based resin is from 0.1 to 100 g/10 minutes.

4. The air bag cover for a passenger of an automobile according to claim 3, wherein the olefin-based resin (A) is homopolypropylene or a propylene random or block copolymer of propylene with ethylene and/or an α-olefin having 4 to 12 carbon atoms.

5. The air bag cover for a passenger of an automobile according to claim 1, wherein the ethylene-α-olefin-based copolymer rubber (B) is an ethylene-α-olefin copolymer rubber and/or ethylene-α-olefin-non-conjugated diene copolymer rubber having a Mooney viscosity at 100° C. of 5 to 150.

6. The air bag cover for a passenger of an automobile according to claim 5, wherein the ethylene-α-olefin copolymer rubber is an ethylene-propylene copolymer rubber and/or ethylene-butene copolymer rubber.

7. The air bag cover for a passenger of an automobile according to claim 1, wherein the aromatic vinyl compound of the hydrogenated aromatic vinyl-conjugated diene compound block copolymer (C) is styrene, and the conjugated diene compound thereof is butadiene or isoprene.

8. The air bag cover for a passenger of an automobile according to claim 1, wherein the ratio by weight of aromatic vinyl compound/conjugated diene compound of the hydrogenated aromatic vinyl-conjugated diene compound block copolymer (C) is 10/90 to 50/50.

9. The air bag cover for a passenger of an automobile according to claim 1, wherein the plasticizer for rubber (D) is a paraffin-based oil.

10. The air bag cover for a passenger of an automobile according to claim 1, wherein the number average molecular weight of (C) is 100000 or more.

11. The air bag cover for a passenger of an automobile according to claim 1, wherein the content of the olefin-based resin (A) per 100 parts by weight of the ethylene-α-olefin-based copolymer rubber (B) is from 40 to 150 parts by weight.

12. The air bag cover for a passenger of an automobile according to claim 1, wherein the weight of (C) per 100 parts by weight of the ethylene-α-olefin-based copolymer rubber (B) is from 10 to 300 parts by weight, the weight of (D) per 100 parts by weight of the ethylene-α-olefin-based copolymer rubber (B) is from 5 to 50 parts by weight, and the weight of (E) per 100 parts by weight of the ethylene-α-olefin-based copolymer rubber (B) is from 10 to 200 parts by weight.

* * * * *